United States Patent [19]
Foltier

[11] 3,925,922
[45] Dec. 16, 1975

[54] MOLE TRAPS

[75] Inventor: Pierre Foltier, Orleans, France

[73] Assignee: Fonderies & Alteliers des Sablons, France

[22] Filed: Mar. 21, 1975

[21] Appl. No.: 560,983

[52] U.S. Cl. .................................. 43/66; 43/80
[51] Int. Cl.² ..................................... A01M 23/08
[58] Field of Search .............. 43/66, 65, 64, 80, 61

[56] References Cited
UNITED STATES PATENTS

| 904,706 | 11/1908 | Martinson | 43/66 |
|---|---|---|---|
| 1,218,514 | 3/1917 | Blakeslee | 43/61 |
| 1,535,001 | 4/1925 | Weisenburger et al. | 43/80 |
| 2,638,700 | 5/1953 | Nantt | 43/80 |
| 2,683,951 | 7/1954 | Hamaker | 43/80 |

Primary Examiner—Warner H. Camp
Attorney, Agent, or Firm—Haseltine, Lake & Waters

[57] ABSTRACT

A tubular enclosure has an open end and a closure wall spaced from the open end and a movable wall pivotably connected to the tube at the open end. The movable wall can be pivoted by the animal on entering the tubular enclosure and the wall will afterwards return to its original position under the action of a spring or by its own weight. An attachment in the form of a tube is externally mounted on the tubular enclosure for projecting above the surface of the ground when the trap is buried in the ground and a resilient wire is slidably mounted in the tube and has one end engaged with the movable wall and an opposite end bent in the form of a loop with a free extremity fitted into the free end of the tube when the trap is put into place. The free extremity of the loop is displaced from the free end of the tube when the animal enters the trap and under the resilience of the wire the free extremity comes to lie outside the outer surface of the tube when the movable wall returns to its original position and the resilient element is retracted back into the tube.

7 Claims, 1 Drawing Figure

U.S. Patent  Dec. 16, 1975  3,925,922
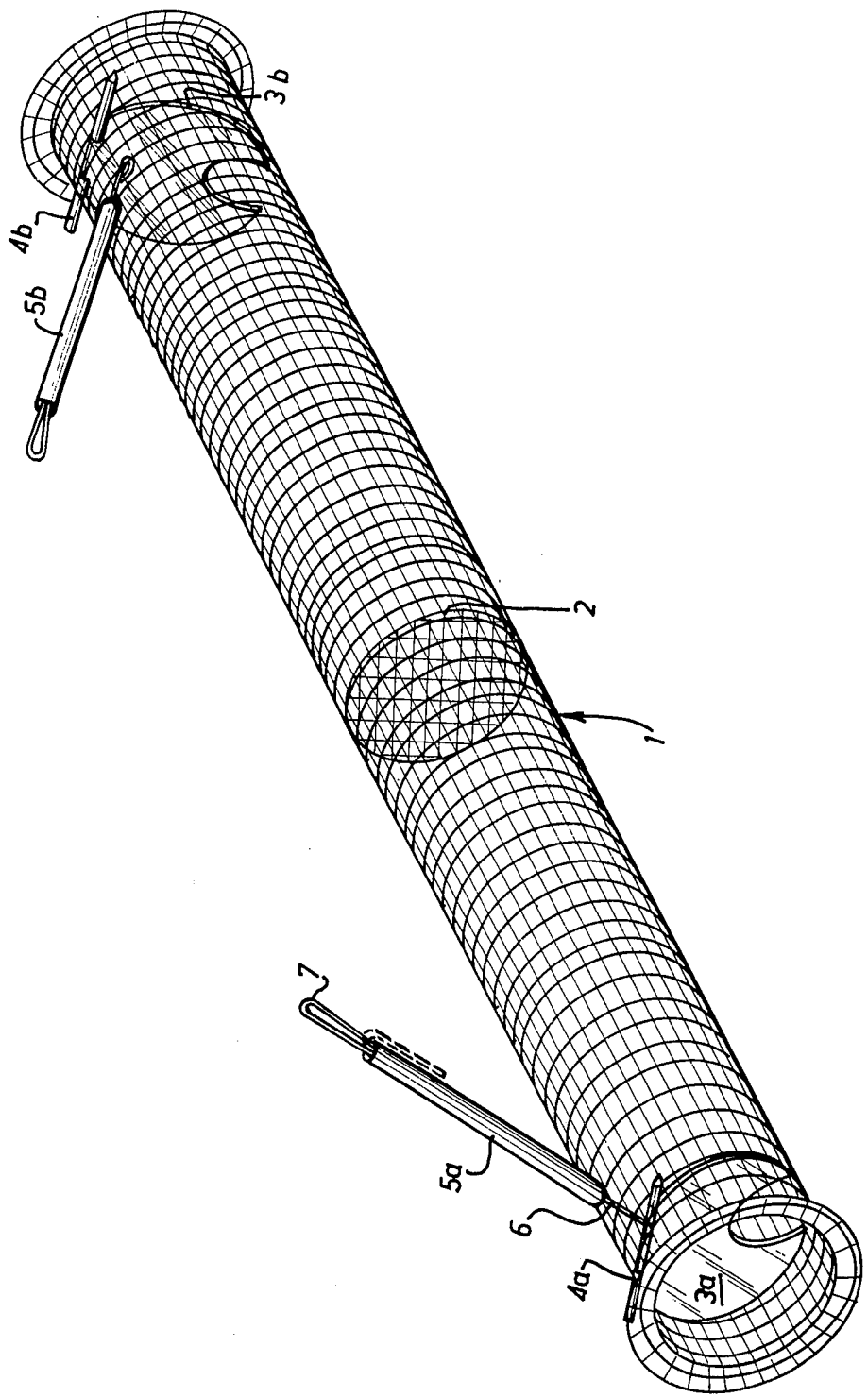

MOLE TRAPS

BACKGROUND

This invention relates to improvements in mole traps of the type comprising a tubular enclosure closed at one end and provided at the other end with a movable wall pivoted about an axis, which the animal pushes back on entering the tubular enclosure and which afterwards returns to its initial position under the action of a spring or under its own weight, thereby imprisoning the mole.

Such traps are easy to use, because it is sufficient to dig up the ground, at the surface where the earth has been raised by the mole and to put the traps into the mole hole.

In spite of their simplicity the traps nevertheless present various difficulties, the most important of which are the following:

when a mole is trapped, there is no signal at the surface to the user of the trap;

the tubes presently in use have a plain wall of such a kind that the mole's scent and suspicion causes him to hesitate to enter the compartment, empty of earth, which interrupts his path.

SUMMARY OF THE INVENTION

An object of the invention is to provide a trap which overcomes these disadvantages.

According to a first characteristic feature of the invention, an attachment in the form of a tube is provided outside the tubular enclosure in order to project at the surface of the ground when the trap is buried, this tube serving to house a rod or resilient metal wire one extremity of which bears against the movable wall and the other extremity, bent in the form of a loop or clip, is fitted into the free end of the tube, when the trap is put into place, and is freed from this free end when the animal penetrates into the trap thus signalling to the user that the trap has been operated.

According to another characteristic feature of the invention, the tubular enclosure constituting the body of the track is constructed as a grill, netting or similar structure, to allow the surrounding earth to penetrate thereinto, when it is buried, this being particularly advantageous in friable ground, especially sandy ground.

This enclosure can be open at one end and closed at the other end or, preferably, because the mole can go along his path in one direction or the other, it is open at both ends with a barrier in its central portion.

BRIEF DESCRIPTION OF THE DRAWING

An embodiment of the invention is shown in perspective view in the sole FIGURE of the drawing.

DETAILED DESCRIPTION

Referring to the drawing the trap comprises a tubular body 1, formed as a grill open at its two ends, and divided into two compartments by a barrier 2 located in its central portion.

At each end of body 1 a movable wall is provided, respectively shown at 3a,3b, each wall being pivotally mounted about a respective axle 4a,4b.

In the region of these walls, two tubes, 5a,5b are fixed on the body 1. Slidably mounted within these tubes are resilient wires 6, the inner ends of which extend inside the body 1 and bear against or otherwise engage the corresponding movable wall, while its outer end 7 is bent into loop form and is fitted into the free end of the associated tube. The extremity of the bent end of the wire resiliently bears against the inner surface of the tube for a purpose which will be explained later.

When a mole enters the trap, it pushes the wall 3a back and, through the action of the latter, the wire 6 is outwardly displaced in tube 5a. The extremity of bend 7 of the wire is freed from the tube 5a so that when the mole has completely entered the body 1 and the wall 3a has returned to its initial position under its own weight or under the action of a spring (not shown), the wire 6 is also retracted, but due to the resilience of the loop 7 its free bent extremity becomes hooked on the edge of the free end of the tube 5a as shown in dotted lines in the drawing.

When the trap is put in place, the user positions the ends of the tubes 5a and 5b so that they project above the ground and thus will be informed at first glance when a mole has entered the trap by the hooked position of the bent end 7 on the tube.

Moreover, it is clear that if the trap is put into friable ground (such as sand or the like) the surrounding material penetrates into the body 1 of the trap, through the mesh of the grill, at least partially eradicating the smells within the body 1 that would have warned the mole not to enter.

Advantageously, the end of the wire 6 that bears on the wall 3a is itself bent, in such a way that it cannot penetrate into the tube 5a. Since the wire 6 is bent at its two ends, its accidental escape from the tube 5a is avoided, which eliminates the risk of losing the wire.

The trap according to the invention thus presents important advantages relative to the known types of trap.

Naturally the ambit of the invention is not avoided by making a trap with a single entrance.

What is claimed is:

1. A mole trap comprising a tubular enclosure having an open end and a closure wall spaced from said open end, a movable wall connected to said tube at said open end for pivotal movement about an axis, which wall the animal pushes back on entering the tubular enclosure and which afterwards returns to its initial position, an attachment in the form of a tube disposed outside the tubular enclosure for projecting above the surface of the ground when the trap is buried in the ground, and a resilient element slidably mounted in said tube and having one end engaged with the movable wall and an opposite end bent in the form of loop and having a free extremity fitted into the free end of said tube, when the trap is put into place, said free extremity of said loop being displaced from the free end of the tube when the animal enters the trap so that said free extremity comes to lie outside the outer surface of the tube when the movable wall returns to its initial position and the resilient element is retracted back into the tube.

2. A mole trap according to claim 1, wherein said tubular enclosure is porous to allow surrounding earth to penetrate thereinto, when it is buried in the ground.

3. A mole trap according to claim 2, wherein said tubular enclosure comprises a grill.

4. A mole trap according to claim 1 wherein said tubular enclosure has two said open ends and is furnished at each open end with a respective movable wall, and a barrier in the tubular enclosure to divide the enclosure into two compartments.

5. A mole trap according to claim 4 wherein said barrier is centrally located in said enclosure.

6. A trap according to claim 1 in which said one end of said resilient element which engages the movable wall is also bent to prevent removal from said tube.

7. A mole trap according to claim 1 wherein said resilient element is a wire.

* * * * *